(12) United States Patent
Aymeloglu et al.

(10) Patent No.: US 9,383,911 B2
(45) Date of Patent: Jul. 5, 2016

(54) MODAL-LESS INTERFACE ENHANCEMENTS

(75) Inventors: Andrew Aymeloglu, Palo Alto, CA (US); Nicholas Miyake, Palo Alto, CA (US); Brandon Burr, Palo Alto, CA (US); Derek Cicerone, Palo Alto, CA (US); Kevin Simler, Palo Alto, CA (US); Garry Tan, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 328 days.

(21) Appl. No.: 12/556,318

(22) Filed: Sep. 9, 2009

(65) Prior Publication Data
US 2010/0070897 A1 Mar. 18, 2010

Related U.S. Application Data

(60) Provisional application No. 61/097,059, filed on Sep. 15, 2008, provisional application No. 61/122,695, filed on Dec. 15, 2008.

(51) Int. Cl.
*G06F 3/0486* (2013.01)
*G06F 17/22* (2006.01)
*G06F 17/27* (2006.01)

(52) U.S. Cl.
CPC .......... *G06F 3/0486* (2013.01); *G06F 17/2288* (2013.01); *G06F 17/2765* (2013.01)

(58) Field of Classification Search
CPC .................... G06F 2203/04803; G06F 21/629; G06F 17/211; G06F 17/24
USPC .......................................... 715/780, 741, 792
See application file for complete search history.

(56) References Cited

U.S. PATENT DOCUMENTS 5,109,399 A 4/1992 Thompson
5,241,625 A 8/1993 Epard et al.
(Continued)

FOREIGN PATENT DOCUMENTS

AU 2013251186 11/2015
CN 102054015 5/2014
(Continued)

OTHER PUBLICATIONS

Acklen, Laura, "Absolute Beginner's Guide to Microsoft Office Word 2003," Dec. 24, 2003, Que, ISBN—10: 0-7897-2970-9, ISBN—13: 978-0-7897-2970-5, pp. 15-18, 34-41, 308-316.*
(Continued)

*Primary Examiner* — Alvin Tan
(74) *Attorney, Agent, or Firm* — Hickman Palermo Becker Bingham LLP

(57) ABSTRACT

A modal-less save interface enables a user to provide a filename under which to save a document at any time during operation of the application, without interrupting other user tasks of the application. The user inputs a filename and performs a save operation on a document without navigating menu items or launching a modal window. The modal-less save interface may be provided in a portion of the main application window. For example, the modal-less save interface may be presented in a toolbar, taskbar, status bar, window pane, or sidebar. An application may feature a modal-less access control interface. The modal-less access control interface may be provided in a portion of the main application window. The access control interface may comprise a control, such as link, button, checkbox, text box, or pull-down menu. Upon selection of the control, the application sets one or more access control levels for the current document.

20 Claims, 6 Drawing Sheets

(56) References Cited

U.S. PATENT DOCUMENTS

| | | | |
|---|---|---|---|
| 5,329,108 A | 7/1994 | Lamoure | |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,845,300 A | 12/1998 | Comer | |
| 5,999,911 A | 12/1999 | Berg | |
| 6,057,757 A | 5/2000 | Arrowsmith et al. | |
| 6,065,026 A | 5/2000 | Cornelia et al. | |
| 6,091,956 A | 7/2000 | Hollenberg | |
| 6,161,098 A | 12/2000 | Wallman | |
| 6,219,053 B1 | 4/2001 | Tachibana et al. | |
| 6,232,971 B1* | 5/2001 | Haynes | 715/800 |
| 6,237,138 B1 | 5/2001 | Hameluck et al. | |
| 6,243,706 B1 | 6/2001 | Morbeau et al. | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1* | 4/2002 | Lin | 715/726 |
| 6,370,538 B1 | 4/2002 | Lamping | |
| 6,430,305 B1 | 8/2002 | Decker | |
| 6,456,997 B1 | 9/2002 | Shukla | |
| 6,523,019 B1 | 2/2003 | Borthwick | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,665,683 B1 | 12/2003 | Meltzer | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,850,317 B2 | 2/2005 | Mullins et al. | |
| 6,877,137 B1 | 4/2005 | Rivette et al. | |
| 6,944,821 B1 | 9/2005 | Bates et al. | |
| 6,967,589 B1 | 11/2005 | Peters | |
| 6,976,210 B1 | 12/2005 | Silva et al. | |
| 6,980,984 B1 | 12/2005 | Huffman et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,086,028 B1 | 8/2006 | Davis et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witkowski | |
| 7,174,377 B2 | 2/2007 | Bernard et al. | |
| 7,194,680 B1 | 3/2007 | Roy | |
| 7,213,030 B1 | 5/2007 | Jenkins | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,392,254 B1 | 6/2008 | Jenkins | |
| 7,426,654 B2 | 9/2008 | Adams et al. | |
| 7,441,182 B2 | 10/2008 | Bellinson et al. | |
| 7,441,219 B2 | 10/2008 | Perry et al. | |
| 7,454,466 B2 | 11/2008 | Bellotti et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2* | 5/2009 | Dirisala | |
| 7,558,677 B2 | 7/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2* | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,703,021 B1* | 4/2010 | Flam | 715/741 |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,765,489 B1 | 7/2010 | Shah et al. | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,818,658 B2* | 10/2010 | Chen | 715/201 |
| 7,870,493 B2 | 1/2011 | Pall et al. | |
| 7,877,421 B2 | 1/2011 | Berger et al. | |
| 7,880,921 B2 | 2/2011 | Dattilo et al. | |
| 7,894,984 B2 | 2/2011 | Rasmussen et al. | |
| 7,899,611 B2 | 3/2011 | Downs et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,336 B1 | 5/2011 | Robin-Jan | |
| 7,958,147 B1 | 6/2011 | Turner | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,966,199 B1 | 6/2011 | Frasher | |
| 7,970,240 B1 | 6/2011 | Chao et al. | |
| 7,971,150 B2 | 6/2011 | Raskutti et al. | |
| 7,984,374 B2 | 7/2011 | Caro et al. | |
| 8,001,465 B2 | 8/2011 | Kudrolli et al. | |
| 8,001,482 B2 | 8/2011 | Bhattiprolu et al. | |
| 8,010,507 B2 | 8/2011 | Poston et al. | |
| 8,010,545 B2 | 8/2011 | Stefik et al. | |
| 8,015,487 B2 | 9/2011 | Roy et al. | |
| 8,024,778 B2 | 9/2011 | Cash et al. | |
| 8,036,632 B1 | 10/2011 | Cona et al. | |
| 8,073,857 B2 | 12/2011 | Sreekanth | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,191,005 B2 | 5/2012 | Baier | |
| 8,214,361 B1 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,271,461 B2 | 9/2012 | Pike et al. | |
| 8,280,880 B1 | 10/2012 | Aymeloglu et al. | |
| 8,290,838 B1 | 10/2012 | Thakur et al. | |
| 8,290,926 B2 | 10/2012 | Ozzie et al. | |
| 8,290,942 B2 | 10/2012 | Jones et al. | |
| 8,301,464 B1 | 10/2012 | Cave et al. | |
| 8,301,904 B1 | 10/2012 | Gryaznov | |
| 8,302,855 B2 | 11/2012 | Ma et al. | |
| 8,312,367 B2 | 11/2012 | Foster | |
| 8,312,546 B2 | 11/2012 | Alme | |
| 8,352,881 B2 | 1/2013 | Champion et al. | |
| 8,368,695 B2 | 2/2013 | Howell et al. | |
| 8,397,171 B2 | 3/2013 | Klassen et al. | |
| 8,412,707 B1 | 4/2013 | Mianji | |
| 8,447,722 B2 | 5/2013 | Ahuja et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,510,743 B2* | 8/2013 | Hackborn et al. | 718/104 |
| 8,514,082 B2 | 8/2013 | Cova et al. | |

(56) References Cited

U.S. PATENT DOCUMENTS

| | | |
|---|---|---|
| 8,515,207 B2 | 8/2013 | Chau |
| 8,527,949 B1 | 9/2013 | Pleis |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,116,975 B2 | 8/2015 | Shankar et al. |
| 9,165,100 B2 | 10/2015 | Begur et al. |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0093755 A1 | 5/2003 | O'Carroll |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1* | 12/2004 | Marcjan et al. .................. 707/8 |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Di Franco et al. |
| 2005/0162523 A1 | 7/2005 | Darrell et al. |
| 2005/0166144 A1* | 7/2005 | Gross ............................ 715/526 |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074881 A1 | 4/2006 | Vembu et al. |
| 2006/0080139 A1 | 4/2006 | Mainzer |
| 2006/0080619 A1* | 4/2006 | Carlson et al. ................ 715/781 |
| 2006/0093222 A1 | 5/2006 | Saffer et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel et al. |
| 2006/0143075 A1 | 6/2006 | Carr et al. |
| 2006/0149596 A1 | 7/2006 | Surpin et al. |
| 2006/0155654 A1 | 7/2006 | Plessis |
| 2006/0178915 A1 | 8/2006 | Chao |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0168871 A1 | 7/2007 | Jenkins |
| 2007/0174760 A1 | 7/2007 | Chamberlain et al. |
| 2007/0185850 A1 | 8/2007 | Walters |
| 2007/0192265 A1 | 8/2007 | Chopin et al. |
| 2007/0198571 A1 | 8/2007 | Ferguson et al. |
| 2007/0208497 A1 | 9/2007 | Downs et al. |

(56) References Cited

U.S. PATENT DOCUMENTS

| | | |
|---|---|---|
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266336 A1* | 11/2007 | Nojima et al. ............... 715/792 |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1* | 3/2008 | Butler ............................. 707/10 |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston |
| 2008/0186904 A1 | 8/2008 | Koyama |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0249820 A1 | 10/2008 | Pathria et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair et al. |
| 2009/0055251 A1 | 2/2009 | Shah et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248757 A1 | 10/2009 | Havewala |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319891 A1 | 12/2009 | MacKinlay et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0047540 A1 | 2/2011 | Williams |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |

(56) References Cited

U.S. PATENT DOCUMENTS

| | | |
|---|---|---|
| 2011/0251951 A1 | 10/2011 | Kolkowitz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh et al. |
| 2012/0106801 A1 | 5/2012 | Jackson |
| 2012/0117082 A1 | 5/2012 | Koperda et al. |
| 2012/0123989 A1 | 5/2012 | Yu |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovich |
| 2012/0197660 A1 | 8/2012 | Prodanovich |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151305 A1 | 6/2013 | Akinola |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk et al. |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |

(56) References Cited

U.S. PATENT DOCUMENTS

| | | | |
|---|---|---|---|
| 2015/0134666 | A1 | 5/2015 | Gattiker et al. |
| 2015/0169709 | A1 | 6/2015 | Kara et al. |
| 2015/0169726 | A1 | 6/2015 | Kara et al. |
| 2015/0170077 | A1 | 6/2015 | Kara et al. |
| 2015/0178825 | A1 | 6/2015 | Huerta |
| 2015/0178877 | A1 | 6/2015 | Bogomolov et al. |
| 2015/0186483 | A1 | 7/2015 | Tappan |
| 2015/0186821 | A1 | 7/2015 | Wang et al. |
| 2015/0187036 | A1 | 7/2015 | Wang et al. |
| 2015/0212663 | A1 | 7/2015 | Papale |
| 2015/0227295 | A1 | 8/2015 | Meiklejohn et al. |
| 2015/0254220 | A1 | 9/2015 | Burr et al. |
| 2015/0309719 | A1 | 10/2015 | Ma et al. |
| 2015/0317342 | A1 | 11/2015 | Grossman et al. |
| 2015/0324868 | A1 | 11/2015 | Kaftan et al. |
| 2016/0062555 | A1 | 3/2016 | Ward et al. |
| 2016/0098176 | A1 | 4/2016 | Cervelli et al. |

FOREIGN PATENT DOCUMENTS

| | | |
|---|---|---|
| DE | 102014103482 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 01/25906 | 4/2001 |
| WO | WO 01/88750 | 11/2001 |
| WO | WO 02/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS mozilla.org, "File Saving Dialogs", Jan. 20, 1999, retrieved from the internet, 6 pages, printed Feb. 11, 2010, http://www.mozilla.org/editor/ui_specs/FileSaveDialogs.html.

java.sun.com, "The New Modality API in Java SE 6", Jan. 2006, retrieved from the internet, 8 pages, printed Feb. 11, 2010, http://java.sun.com/developer/technicalArticles/J2SE/Desktop/javase6/modality/.

PCT/US2009/056703, International Search Report and Written Opinion, Mailed Mar. 15, 2010, 11 pages.

Goswami, Gautam, "Quite Writly Said!", One Brick at a Time, dated Aug. 21, 2005, 7 pages.

European Patent Office, Search Report in application No. 09813695.5-1507, dated Apr. 9, 2014, 7 pages.

European Claims in application No. 09813695.5-1507, dated Apr. 2014, 5 pages.

Conner, Nancy, "Google Apps: The Missing Manual", dated May 1, 2008, 15 pages.

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

About 80 Minutes, "Palantir in a Number of Parts—Part 6—Graph," Mar. 21, 2013, pp. 1-6.

Abbey, Kristen, "Review of Google Docs," retrieved from the Internet May 1, 2007, 2 pages.

Alur et al., "Chapter 2: IBM InfoSphere DataStage Stages," IBM InfoSphere DataStage Data Flow and Job Design, Jul. 1, 2008, pp. 35-137.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Gesher, Ari, "Palantir Screenshots in the Wild: Swing Sightings," The Palantir Blog, Sep. 11, 2007, pp. 1-12.

GIS-NET 3 Public—Department of Regional Planning. Planning & Zoning Information for UNINCORPORATED LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Hansen et al. "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.

(56) References Cited

OTHER PUBLICATIONS

Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents," 2002, 6 pages.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palantir Technologies, "Palantir Labs—Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Quest, "Toad for Oracle 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
U.S. Appl. No. 14/102,394, filed Dec. 10, 2013, Notice of Allowance, Aug. 5, 2014.
U.S. Appl. No. 14/108,187, filed Dec. 16, 2013, Notice of Allowance, Aug. 29, 2014.
U.S. Appl. No. 14/135,289, filed Dec. 19, 2013, Notice of Allowance, Oct. 14, 2014.
U.S. Appl. No. 14/268,964, filed May 2, 2014, Notice of Allowance, Dec. 3, 2014.
U.S. Appl. No. 14/192,767, filed Feb. 27, 2014, Notice of Allowance, Dec. 16, 2014.
U.S. Appl. No. 14/294,098, filed Jun. 2, 2014, Notice of Allowance, Dec. 29, 2014.
U.S. Appl. No. 14/473,860, filed Aug. 29, 2014, Notice of Allowance, Jan. 5, 2015.
U.S. Appl. No. 14/616,080, filed Feb. 6, 2015, Notice of Allowance, Apr. 2, 2015.
U.S. Appl. No. 14/486,991, filed Sep. 15, 2014, Notice of Allowance, May 1, 2015.
U.S. Appl. No. 14/225,084, filed Mar. 25, 2014, Notice of Allowance, May 4, 2015.
U.S. Appl. No. 14/504,103, filed Oct. 1, 2014, Notice of Allowance, May 18, 2015.
U.S. Appl. No. 14/473,552, filed Aug. 29, 2014, Notice of Allowance, Jul. 24, 2015.
U.S. Appl. No. 14/289,596, filed May 28, 2014, First Action Interview, Jul. 18, 2014.
U.S. Appl. No. 14/289,599, filed May 28, 2014, First Action Interview, Jul. 22, 2014.
U.S. Appl. No. 14/225,160, filed Mar. 24, 2014, First Action Interview, Jul. 29, 2014.
U.S. Appl. No. 14/294,098, filed Jun. 2, 2014, First Action Interview, Aug. 15, 2014.
U.S. Appl. No. 14/255,084, filed Mar. 25, 2014, First Action Interview, Sep. 2, 2014.
U.S. Appl. No. 14/268,964, filed May 2, 2014, First Action Interview, Sep. 3, 2014.
U.S. Appl. No. 14/306,154, filed Jun. 16, 2014, First Action Interview, Sep. 9, 2014.
U.S. Appl. No. 14/306,147, filed Jun. 16, 2014, First Action Interview, Sep. 9, 2014.
U.S. Appl. No. 14/225,006, filed Mar. 25, 2014, First Action Interview, Sep. 10, 2014.
U.S. Appl. No. 14/306,138, filed Jun. 16, 2014, First Action Interview, Sep. 23, 2014.
U.S. Appl. No. 14/148,568, filed Jan. 6, 2014, Final Office Action, Oct. 22, 2014.
U.S. Appl. No. 14/225,160, filed Mar. 24, 2014, First Action Interview, Oct. 22, 2014.

(56) References Cited

OTHER PUBLICATIONS

U.S. Appl. No. 14/294,098, filed Jun. 2, 2014, Final Office Action, Nov. 6, 2014.
U.S. Appl. No. 14/319,765, filed Jun. 30, 2014, First Action Interview, Nov. 25, 2014.
U.S. Appl. No. 14/323,935, filed Jul. 30, 2014, First Action Interview, Nov. 28, 2014.
U.S. Appl. No. 14/326,738, filed Jul. 9, 2014, First Action Interview, Dec. 2, 2014.
U.S. Appl. No. 14/289,596, filed May 28, 2014, Final Office Action, Jan. 26, 2015.
U.S. Appl. No. 14/319,765, filed Jun. 30, 2014, First Action Interview, Feb. 4, 2015.
U.S. Appl. No. 14/504,103, filed Oct. 1, 2014, First Action Interview, Feb. 5, 2015.
U.S. Appl. No. 14/225,160, filed Mar. 24, 2014, Final Office Action, Feb. 11, 2015.
U.S. Appl. No. 14/306,138, filed Jun. 16, 2014, Final Office Action, Feb. 18, 2015.
U.S. Appl. No. 14/306,147, filed Jun. 16, 2014, Final Office Action, Feb. 19, 2015.
U.S. Appl. No. 14/225,084, filed Mar. 25, 2014, First Action Interview, Feb. 20, 2015.
U.S. Appl. No. 14/473,552, filed Aug. 29, 2014, Interview Summary, Feb. 24, 2015.
U.S. Appl. No. 14/225,006, filed Mar. 25, 2014, First Action Interview, Feb. 27, 2015.
U.S. Appl. No. 13/831,791, filed Mar. 15, 2013, Office Action, Mar. 4, 2015.
U.S. Appl. No. 14/486,991, filed Sep. 15, 2014, Office Action, Mar. 10, 2015.
U.S. Appl. No. 14/306,154, filed Jun. 16, 2014, Final Office Action, Mar. 11, 2015.
U.S. Appl. No. 14/148,568, filed Jan. 6, 2014, Office Action, Mar. 26, 2015.
U.S. Appl. No. 14/323,935, filed Jul. 30, 2014, First Action Interview, Mar. 31, 2015.
U.S. Appl. No. 14/326,738, filed Jul. 9, 2014, First Action Interview, Mar. 31, 2015.
U.S. Appl. No. 13/247,987, filed Sep. 28, 2011, Office Action, Apr. 2, 2015.
U.S. Appl. No. 14/289,596, filed May 28, 2014, Advisory Action, Apr. 30, 2015.
U.S. Appl. No. 14/196,814, filed Mar. 4, 2014, Office Action, May 5, 2015.
U.S. Appl. No. 14/306,154, filed Jun. 16, 2014, Advisory Action, May 15, 2015.
U.S. Appl. No. 14/639,606, filed Mar. 5, 2015, First Action Interview, May 18, 2015.
U.S. Appl. No. 14/225,160, filed Mar. 24, 2014, Advisory Action, May 20, 2015.
U.S. Appl. No. 14/579,752, filed Dec. 22, 2014, First Action Interview, May 26, 2015.
U.S. Appl. No. 14/306,138, filed Jun. 16, 2014, Office Action, May 26, 2015.
U.S. Appl. No. 14/289,599, filed May 28, 2014, Final Office Action, May 29, 2015.
U.S. Appl. No. 14/319,765, filed Jun. 30, 2014, Final Office Action, Jun. 16, 2015.
U.S. Appl. No. 13/835,688, filed Mar. 15, 2013, First Action Interview, Jun. 17, 2015.
U.S. Appl. No. 14/323,935, filed Jul. 30, 2014, Office Action, Jun. 22, 2015.
U.S. Appl. No. 12/556,318, filed Jun. 16, 2014, Office Action, Jul. 2, 2015.
U.S. Appl. No. 14/306,154, filed Jun. 16, 2014, Office Action, Jul. 6, 2015.
U.S. Appl. No. 14/639,606, filed Mar. 5, 2015, First Action Interview, Jul. 24, 2015.
U.S. Appl. No. 14/326,738, filed Jul. 9, 2014, Final Office Action, Jul. 31, 2015.
U.S. Appl. No. 13/839,026, filed Mar. 15, 2013, Office Action, Aug. 4, 2015.
U.S. Appl. No. 13/831,791, filed Mar. 15, 2013, Final Office Action, Aug. 6, 2015.
U.S. Appl. No. 14/306,147, filed Jun. 16, 2014, Office Action, Aug. 7, 2015.
U.S. Appl. No. 14/225,160, filed Mar. 24, 2014, Office Action, Aug. 12, 2015.
U.S. Appl. No. 14/490,612, filed Sep. 18, 2014, Final Office Action, Aug. 18, 2015.
U.S. Appl. No. 14/579,752, filed Dec. 22, 2014, Final Office Action, Aug. 19, 2015.
U.S. Appl. No. 14/225,006, filed Mar. 24, 2014, Final Office Action, Sep. 2, 2015.
U.S. Appl. No. 14/631,633, filed Feb. 25, 2015, First Action Interview, Sep. 10, 2015.
U.S. Appl. No. 14/726,353, filed May 29, 2015, First Action Interview, Sep. 10, 2015.
U.S. Appl. No. 14/225,084, filed Mar. 25, 2014, Office Action, Sep. 11, 2015.
U.S. Appl. No. 14/306,138, filed Jun. 16, 2014, Final Office Action, Sep. 14, 2015.
U.S. Appl. No. 14/289,599, filed May 28, 2014, Advisory Action, Sep. 4, 2015.
U.S. Appl. No. 13/247,987, filed Sep. 28, 2011, Office Action, Sep. 22, 2015.
U.S. Appl. No. 14/813,749, filed Jul. 30, 2015, Office Action, Sep. 28, 2015.
U.S. Appl. No. 14/134,558, filed Dec. 19, 2013, Office Action, Oct. 7, 2015.
U.S. Appl. No. 14/639,606, filed Mar. 5, 2015, Final Office Action, Oct. 16, 2015.
U.S. Appl. No. 14/306,154, filed Jun. 16, 2014, Final Office Action, Nov. 16, 2015.
U.S. Appl. No. 14/306,138, filed Jun. 16, 2014, Interview Summary, Dec. 3, 2015.
U.S. Appl. No. 13/839,026, filed Mar. 15, 2013, Restriction Requirement, Apr. 2, 2015.
U.S. Appl. No. 14/148,568, filed Jan. 6, 2014, Notice of Allowance, Aug. 26, 2015.
U.S. Appl. No. 12/556,318, filed Jun. 16, 2014, Notice of Allowance, Nov. 2, 2015.
U.S. Appl. No. 14/326,738, filed Jul. 9, 2014, Notice of Allowance, Nov. 18, 2015.
Rouse, Margaret, "OLAP Cube," <http://searchdatamanagement.techtarget.com/definition/OLAP-cube>, Apr. 28, 2012, pp. 16.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Symantec Corporation, "E-Security Begins with Sound Security Policies," Announcement Symantec, Jun. 14, 2001.
"The FASTA Program Package," fasta-36.3.4, Mar. 25, 2011, pp. 29.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Wikipedia, "Federated Database System," Sep. 7, 2013, retrieved from the internet on Jan. 27, 2015 http://en.wikipedia.org/w/index.php?title=Federated_database_system&oldid=571954221.

(56) References Cited

OTHER PUBLICATIONS

Wright et al., "Palantir Technologies VAST 2010 Challenge Text Records—Investigations into Arms Dealing," Oct. 29, 2010, pp. 1-10.
Yang et al., "HTML Page Analysis Based on Visual Cues," 2001, pp. 859-864.
Official Communication for European Patent Application No. 09813693.0 dated Apr. 8, 2014, 7 pages.
Claims for European Patent Application No. 09813693.0 dated Apr. 2014, 6 pages.
International Search Report & Written Opinion for PCT/US2009/056700 dated Apr. 15, 2010, 10 pages.
Claims for International Patent Application No. PCT/US2009/056700, 5 pages.
"How Word Creates and Recovers the AutoRecover Files," from support.microsoft.com, Jan. 18, 2007, retrieved from the internet at http://support.microsoft.com/kb/107686 on Feb. 11, 2010.
"Managing Versions and Checking Documents In and Out (Windows SharePoint Services 2.0)", from technet.microsoft.com, printed Feb. 11, 2010 from http://technet.microsoft.com/en-us/library/cc287876.aspx.
"Introduction to Versioning," from office.microsoft.com, Windows SharePoint Services, retrieved from the internet at http://office.microsoft.com/en-us/sharepointtechnology/HA100215761033.aspx?mode=print printed on Feb. 11, 2010, 5 pages.
Alamo PC Organization, "Windows Tips & Tricks," from www.alamopc.org, retrieved from the internet on Feb. 11, 2010 at http://www.alamopc.org/pcalamode/columns/beverley/bb0301.shtml, 4 pages.
"A Visual Guide to Version Control," betterexplained.com, Sep. 27, 2007, retrieved from the internet on Feb. 11, 2010 at http://betterexplained.com/articles/a-visual-guide-to-version-control/, 10 pages.
Notice of Acceptance for Australian Patent Application No. 2014250678 dated Oct. 7, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for European Patent Application No. 14158861.6 dated Jun. 16, 2014.
Official Communication for European Patent Application No. 14159464.8 dated Jul. 31, 2014.
Official Communication for New Zealand Patent Application No. 627962 dated Aug. 5, 2014.
Official Communication for New Zealand Patent Application No. 628263 dated Aug. 12, 2014.
Official Communication for Great Britain Patent Application No. 1404457.2 dated Aug. 14, 2014.
Official Communication in New Zealand Patent Application No. 628495 dated Aug. 19, 2014.
Official Communication for European Patent Application No. 14159464.8 dated Aug. 20, 2014.
Official Communication for New Zealand Patent Application No. 628161 dated Aug. 25, 2014.
Official Communication for New Zealand Patent Application No. 628585 dated Aug. 26, 2014.
Official Communication for New Zealand Patent Application No. 628840 dated Aug. 28, 2014.
Official Communication for European Patent Application No. 14159464.8 dated Sep. 22, 2014.
Official Communication for Great Britain Patent Application No. 1408025.3 dated Nov. 6, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for European Patent Application No. 14180281.9 dated Jan. 26, 2015.
Official Communication for Great Britain Patent Application No. 1413935.6 dated Jan. 27, 2015.
Official Communication for European Patent Application No. 14180142.3 dated Feb. 6, 2015.
Official Communication for European Patent Application No. 14187996.5 dated Feb. 12, 2015.
Official Communication for European Patent Application No. 14186225.0 dated Feb. 13, 2015.
Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for Netherlands Patent Application No. 2013306 dated Apr. 24, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for Australian Patent Application No. 2014213553 dated May 7, 2015.
Official Communication for European Patent Application No. 14189802.3 dated May 11, 2015.
Official Communication for European Patent Application No. 14191540.5 dated May 27, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014250678 dated Jun. 17, 2015.
Official Communication for European Patent Application No. 14180432.8 dated Jun. 23, 2015.
Official Communication for European Patent Application No. 14187739.9 dated Jul. 6, 2015.
Official Communication for European Patent Application No. 15155846.7 dated Jul. 8, 2015.
Official Communication for European Patent Application No. 15165244.3 dated Aug. 27, 2015.
Official Communication for Netherlands Patent Application No. 2012437 dated Sep. 18, 2015.
Official Communication for European Patent Application No. 15155845.9 dated Oct. 6, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
U.S. Appl. No. 12/556,321, filed Sep. 9, 2009.
Official Communication for European Patent Application No. 15190307.7 dated Feb. 19, 2016.
"How to: Auto Save a Document Before Printing in Word 2007," Ask Drexel University Knowledge Base, published Nov. 13, 2007, http://askdrexel.drexel.edu/app/answers/detail, 2 pages.
U.S. Appl. No. 14/571,098, filed Dec. 15, 2014, First Office Action Interview, Mar. 11, 2015.
U.S. Appl. No. 13/669,274, filed Nov. 5, 2012, Final Office Action, May 6, 2015.
U.S. Appl. No. 13/827,491, filed Mar. 14, 2013, Final Office Action, Jun. 22, 2015.

(56) References Cited

OTHER PUBLICATIONS

U.S. Appl. No. 12/556,321, filed Sep. 9, 2009, Office Action, Jul. 7, 2015.
U.S. Appl. No. 14/552,336, filed Nov. 24, 2014, First Office Action Interview, Jul. 20, 2015.
U.S. Appl. No. 14/571,098, filed Dec. 15, 2014, First Office Action Interview, Aug. 5, 2015.
U.S. Appl. No. 14/571,098, filed Dec. 15, 2014, First Office Action Interview, Aug. 24, 2015.
U.S. Appl. No. 13/669,274, filed Nov. 5, 2012, Advisory Action, Aug. 26, 2015.
U.S. Appl. No. 13/827,491, filed Mar. 14, 2013, Office Action, Oct. 9, 2015.
U.S. Appl. No. 14/571,098, filed Dec. 15, 2014, First Office Action Interview, Nov. 10, 2015.
U.S. Appl. No. 14/842,734, filed Sep. 1, 2015, First Office Action, Nov. 19, 2015.
U.S. Appl. No. 14/222,364, filed Mar. 21, 2014, Office Action, Dec. 9, 2015.
U.S. Appl. No. 14/800,447, filed Jul. 15, 2012, First Office Action Interview, Dec. 10, 2010.
U.S. Appl. No. 14/883,498, filed Oct. 14, 2015, First Office Action Interview, Dec. 24, 2015.
U.S. Appl. No. 14/871,465, filed Sep. 30, 2015, First Office Action Interview, Feb. 9, 2016.
U.S. Appl. No. 14/741,256, filed Jun. 16, 2015, Office Action, Feb. 9, 2016.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Chaudhuri et al., "An Overview of Business Intelligence Technology," Communications of the ACM, Aug. 2011, vol. 54, No. 8.
Galliford, Miles, "SnagIt Versus Free Screen Capture Software: Critical Tools for Website Owners," <http://www.subhub.com/articles/free-screen-capture-software>, Mar. 27, 2008, pp. 11.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Microsoft Windows, "Microsoft Windows Version 2002 Print Out 2," 2002, pp. 1-6.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, <http://oreilly.com/digitalmedia/2006/01/01/mac-os-x-screenshot-secrets.html> published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Notice of Acceptance for Australian Patent Application No. 2013251186 dated Nov. 6, 2015.
Official Communication for European Patent Application No. 12181585.6 dated Sep. 4, 2015.
Official Communication for New Zealand Patent Application No. 622473 dated Mar. 27, 2014.
Official Communication for New Zealand Patent Application No. 622473 dated Jun. 19, 2014.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Australian Patent Application No. 2013251186 dated Mar. 12, 2015.
Official Communication for Canadian Patent Application No. 2831660 dated Jun. 9, 2015.
Official Communication for Netherlands Patent Application No. 2011729 dated Aug. 13, 2015.
Official Communication for Netherlands Patent Application No. 2012438 dated Sep. 21, 2015.
Official Communication for European Patent Application No. 15188106.7 dated Feb. 3, 2016.
U.S. Appl. No. 14/841,338, filed Aug. 31, 2015, Office Action, Feb. 18, 2016.
U.S. Appl. No. 14/71,834, filed May 19, 2015, First Office Action Interview, Feb. 19, 2016.
U.S. Appl. No. 12/556,321, filed Sep. 9, 2009, Final Office Action, Feb. 25, 2016.
U.S. Appl. No. 14/961,481, filed Dec. 7, 2015, Office Action Interview, Mar. 2, 2016.
U.S. Appl. No. 14/715,834, filed May 19, 2015, Office Action Interview, Apr. 13, 2016.
U.S. Appl. No. 14/800,447, filed Jul. 15, 2015, Interview Summary, Mar. 3, 2016.
U.S. Appl. No. 14/883,498, filed Oct. 14, 2015, Office Action, Mar. 17, 2016.
U.S. Appl. No. 14/871,465, filed Sep. 30, 2015, First Office Action Interview, Apr. 11, 2016.

* cited by examiner

MODAL-LESS INTERFACE ENHANCEMENTS

PRIORITY CLAIM

This application claims the benefit of Provisional Application 61/097,059, entitled "Collaborative Interface Enhancements" and filed Sep. 15, 2008, the entire contents of which is hereby incorporated by reference as if fully set forth herein, under 35 U.S.C. §119(e). This application further claims the benefit of Provisional Application 61/122,695, entitled "WorkFlows, Screenshot Techniques, and Sharing Information across Servers" and filed Dec. 15, 2008, the entire contents of which is hereby incorporated by reference as if fully set forth herein, under 35 U.S.C. §119(e).

CROSS-REFERENCE TO RELATED APPLICATIONS

This application is related to U.S. patent application Ser. No. 12/556,321, entitled "Automatic Creation and Server Push of Drafts" and filed concurrently, the entire contents of which are hereby incorporated by reference for all purposes as if fully set forth herein.

FIELD OF THE INVENTION

Embodiments of the invention described herein relate generally to document management, and, more specifically, to techniques for providing save and access control interfaces in a document authoring application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graphical interface design techniques traditionally rely upon modal windows to provide document saving functionality within applications. A "modal window" is a child window of another application window that is generated when the application enters a particular operating mode. Modal windows are often referred to as modal dialogs in that they are used to display dialogs that solicit user input, such as a save dialog.

A problem with using a modal window to facilitate document saving functionality is that modal windows interrupt application workflow. For example, to save a document in an application such as Microsoft Word, a user must navigate to and select a menu item in a toolbar that launches the modal window for the save dialog. The user must then wait for the application to launch the modal window. The modal window for the save dialog then appears over the main application window, and the user cannot edit a document or perform any other function with the application until the save operation is complete. To complete the operation, the user must select a folder in which to save the document and a filename for the document, then click a button to trigger the save operation.

Because save operations interrupt an application's workflow, it is inefficient for users to save their work. This inefficiency is especially pronounced when new or different filenames are frequently required.

In one approach, once a filename has been identified, save dialogs typically "remember" the filename, so as to cut down on the amount of work required of a user. However, the application must still launch a modal window for the save dialog. The delay between a user selecting the menu item and the modal window appearing can often be one of the biggest sources of inefficiency in the save process. Furthermore, the modal window still interrupts the workflow of the main application window.

In another approach, shortcut keys facilitate rapid saving of a document under the same filename. However, the user must still launch a save dialog in a modal window when the document does not have a name, or when the user wants to change the name.

A similar problem exists in interfaces for managing access rights for a document. Document access control operations in graphical interfaces are inefficient in that they traditionally require a user to navigate through complex menus and modal windows. Furthermore, it is often not apparent to a user that it is even possible to control the level of access that other users will have to their documents. Therefore, many users fail to properly protect access to their documents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
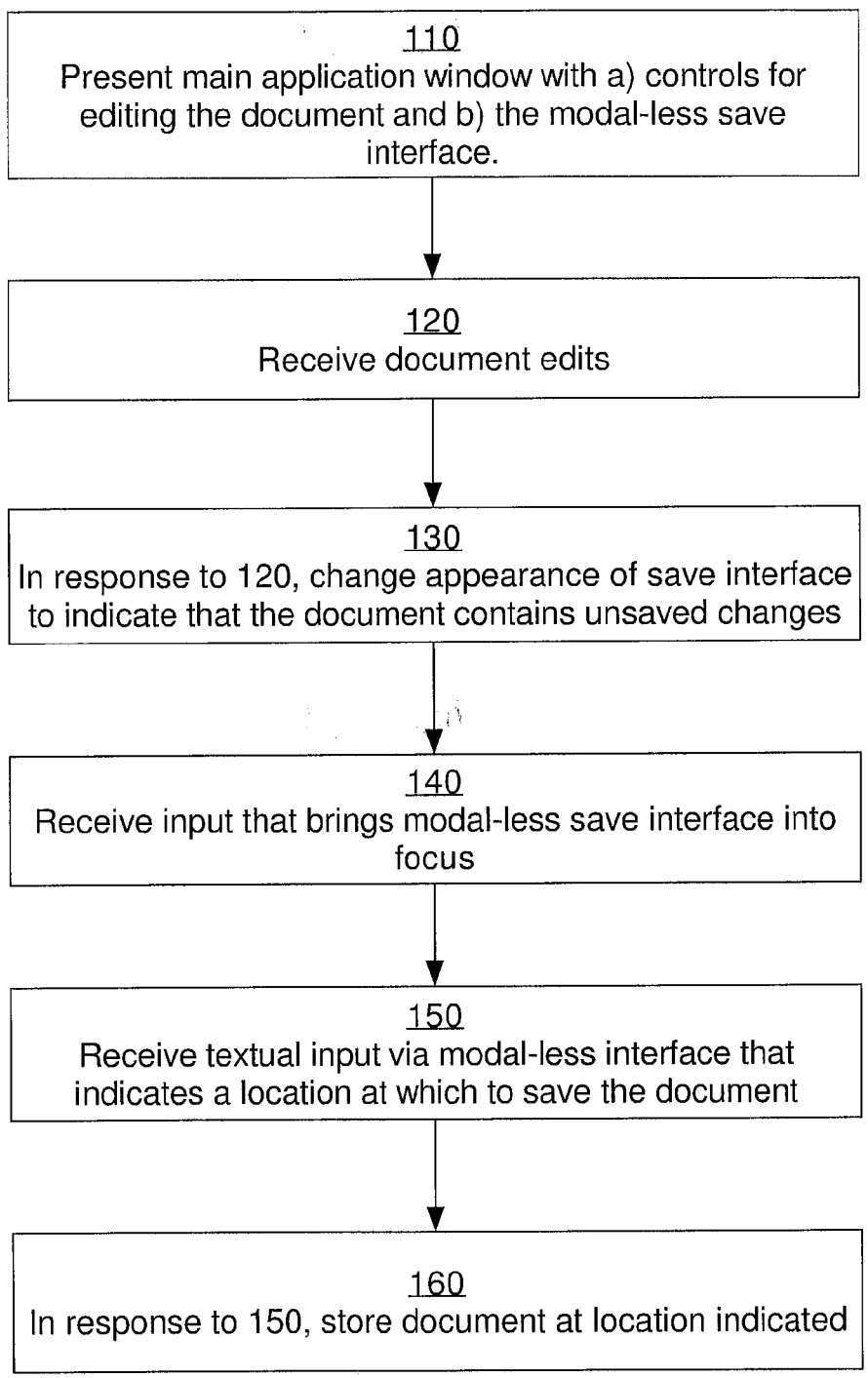
FIG. 1 is a flow chart illustrating a method for providing modal-less save functionality.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   1.1. Terms and Definitions
2.0. Functional Overview
   2.1. Modal-Less Save Interface
   2.2. Modal-Less Access Control Interface
3.0. Implementation Examples
   3.1. Example Modal-less Save Interface
   3.2. Example Modal-less Access Control Interface 3.3. Save Status Feedback
3.4. Access Levels
4.0. Implementation Mechanism—Hardware Overview
5.0. Extensions and Alternatives
6.0. Conclusion

1.0. GENERAL OVERVIEW

Approaches, techniques, and mechanisms are disclosed for modal-less save and access control operations. According to an embodiment, a modal-less save interface enables a user to provide a filename under which to save a document at any time during operation of the application, without interrupting other user tasks of the application. Various controls allow a user to input a filename and perform a save operation on a document without the user having to navigate menu items or launch a modal window. The modal-less save interface may be provided in a portion of the main application window. For example, the modal-less save interface may be presented in a toolbar, taskbar, status bar, window pane, sidebar, or any other component of the application window.

According to an embodiment, an application may feature a modal-less access control interface. The modal-less access control interface may be provided in a portion of the main application window. The access control interface may comprise a control, such as link, button, checkbox, text box, or pull-down menu. Upon selection, the control sets the access control level for the document currently open within the application window. The access control interface may be accessed at any time during a user's interaction with the main application window.

In other aspects, the invention encompasses a computer apparatus and a computer-readable medium configured to carry out the foregoing steps.

1.1. Terms and Definitions

For convenience, various embodiments of the techniques described herein are described with respect to "documents." As used herein, a document is any type of object, including files and other resources, that embodies, encapsulates, or encodes information in structured data.

Specifically, the data for a document is structured in such a manner so as to be understood by one or more document authoring applications. An application understands structured data when the application, upon reading the data, may perform various actions with the information represented by the object, such as presenting the information to a user. Documents may include word processing files, PDF files, images, and any other form of structured data. Moreover, a document authoring application is any application that may interpret a document in such a manner so as to deliver one or more visual presentations of the information embodied, encapsulated, or encoded within the document.

2.0. FUNCTIONAL OVERVIEW 2.1. Modal-Less Save Interface

FIG. 1 is a flow chart 100 illustrating a method for providing modal-less save functionality, according to an embodiment. The illustrated embodiment is exemplary only—other embodiments may implement more or fewer steps, in different orders.

At step 110, an application executing at a computing device presents to a user an application window for working with a document. This application window includes at least: a) one or more controls for editing the document and b) a modal-less save interface. For example, the application may be a Palantir Finance client, and the document may be a financial analysis document that the user has newly created. The one or more controls may be any controls suitable for accepting user input for editing the document, including text fields, buttons, pull-down menus, and drag-and-drop elements. The save interface includes an editable text box. The save interface may optionally include a save button. An example application window is described in section 3.1.

At step 120, the application receives, via the one or more controls, one or more commands to add information to or modify information in the document. For example, a user may select and modify text displayed for the object in the application window.

At step 130, in response to step 120, the application changes the appearance of the save interface to indicate that the opened document contains unsaved changes. For example, the application may change a background color or font in the save interface. Other techniques for indicating the save status of a document are discussed in section 3.3.

At step 140, the application receives input that brings the save interface into focus. For example, a user may use a mouse or enter a keystroke combination to bring the editable text box into focus.

At step 150, while the save interface is in focus, the application receives textual input that indicates a location at which to save the object. For example, the user may then enter a name, such as "object 1", in the editable text box.

In an embodiment, the input of step 150 may not necessarily specify an exact file system location at which the document is to be saved; rather, the entered text may be used to determine the location at which to save the document. For example, the application may transparently append extensions or other identifiers to the file name. The application may also assume that the entered file name is relative to some path—for example, a root directory on a server at which the application stores its documents. In another embodiment, the entered file name may instead exactly specify the save location with, for example, an absolute path.

In some embodiments, a file name may already be present in the editable text box. For example, in the case of a newly created document, the application may pre-populate the text box with a generic name. In the case of a previously saved document, the application may have already filled in the text box with the name under which the document was last saved. When a file name is already present in the text box, the application may allow a user to simply edit that file name. Or, the application may let the user type in an entirely new file name.

In an embodiment, the user terminates the input by pressing an Enter key, thereby indicating that the file name has been fully entered. In another embodiment, the user terminates the input by clicking on a save button in the save interface. In an embodiment, the user terminates the input by using the mouse or keyboard to switch focus away from the save interface. Yet other embodiments may rely on other or additional techniques for terminating the input of step 140.

At step 160, in response to the input of step 150, the application stores the object at the location indicated by the input of step 150.

Figure 2:
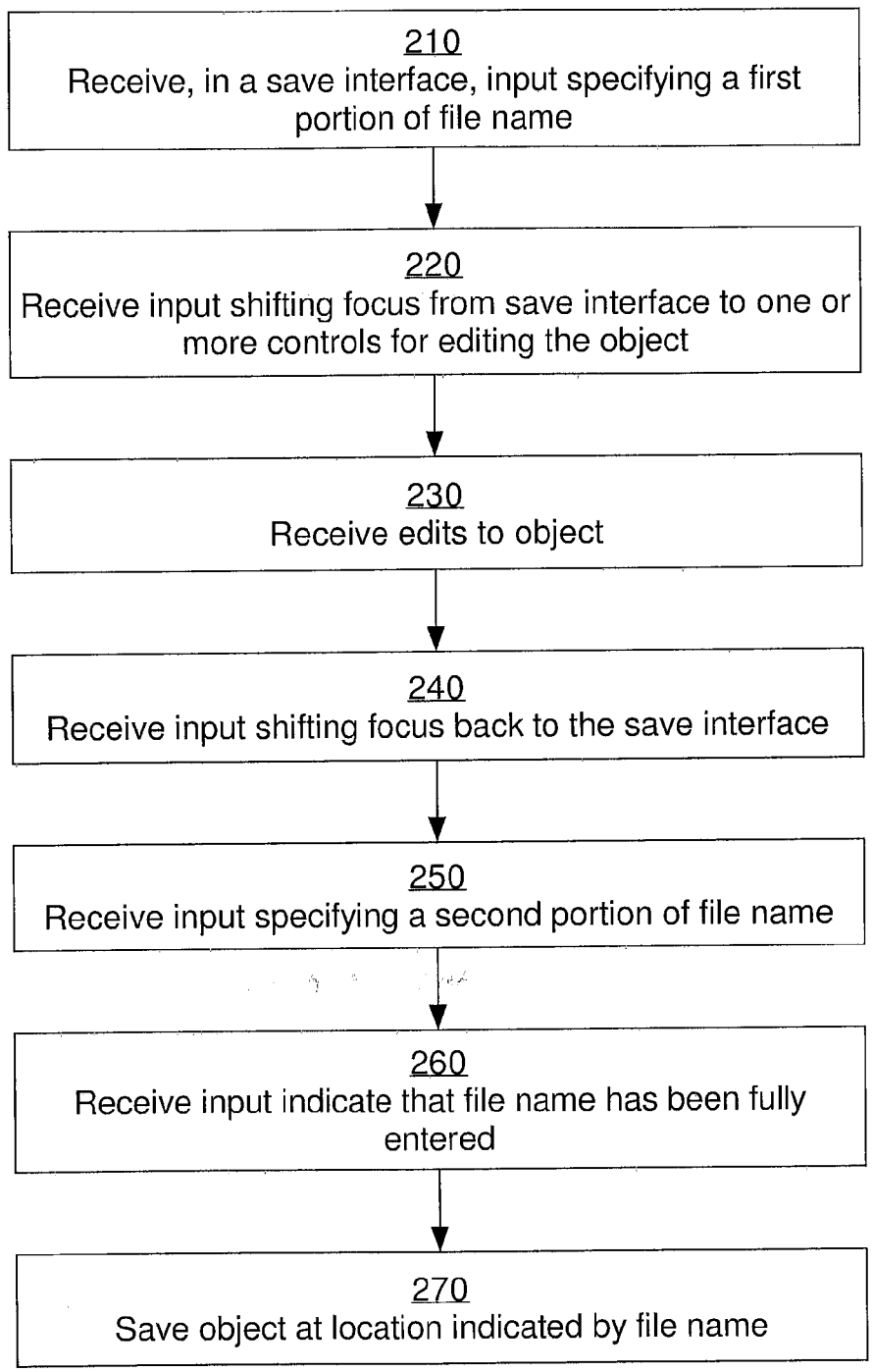
FIG. 2 is a flow chart illustrating a method for performing a save operation that is supported by modal-less save functionality.

FIG. 2 is a flow chart 200 illustrating a method for performing a save operation that is supported by modal-less save functionality, according to an embodiment of the invention. The method takes advantage of the fact that the modal-less save interface does not restrict the application's workflow, even when assigning a new name to the saved object. Thus, unlike many conventional save interfaces, save operations facilitated by a modal-less save interface may be interrupted while the user performs other document-related tasks. Again, the illustrated embodiment is exemplary only—other embodiments may implement more or fewer steps, in different orders.

At step 210, an application receives, in a save interface, input specifying a first set of one or more characters of a name under which a currently open object is to be saved. For example, suppose that the user intended to name the currently open document "object1." The user may enter the first three characters "obj," and thereby accomplish step 210.

At step 220, subsequent to step 210, the application receives input shifting focus from the save interface and to one or more controls for editing the object. For example, while typing a name under which to save the object, the user may have noticed additional modifications that needed to be made to the object. The user may have then immediately clicked on an editing control so as to make the change.

At step 230, subsequent to step 220, the application receives input via the one or more editing controls. The input indicates one or more edits to the currently open object.

At step 240, upon completion of the edits, the application receives input shifting focus back to the save interface.

At step 250, while focused again at the save interface, the application may receive input specifying a second set of one or more characters of the name. For example, the user may enter "ect" to complete the document's name. In other words, the document's name comprises the second set of characters ("ect") added to the first set of characters ("obj").

At step 260, subsequent to step 250, the application may receive input indicating that the name has been fully entered. For example, the user may click on a save button or press an Enter key.

At step 270, in response to the input of step 260, the application may save the object at a location based upon the specified document name.

2.2. Modal-Less Access Control Interface

Figure 3:
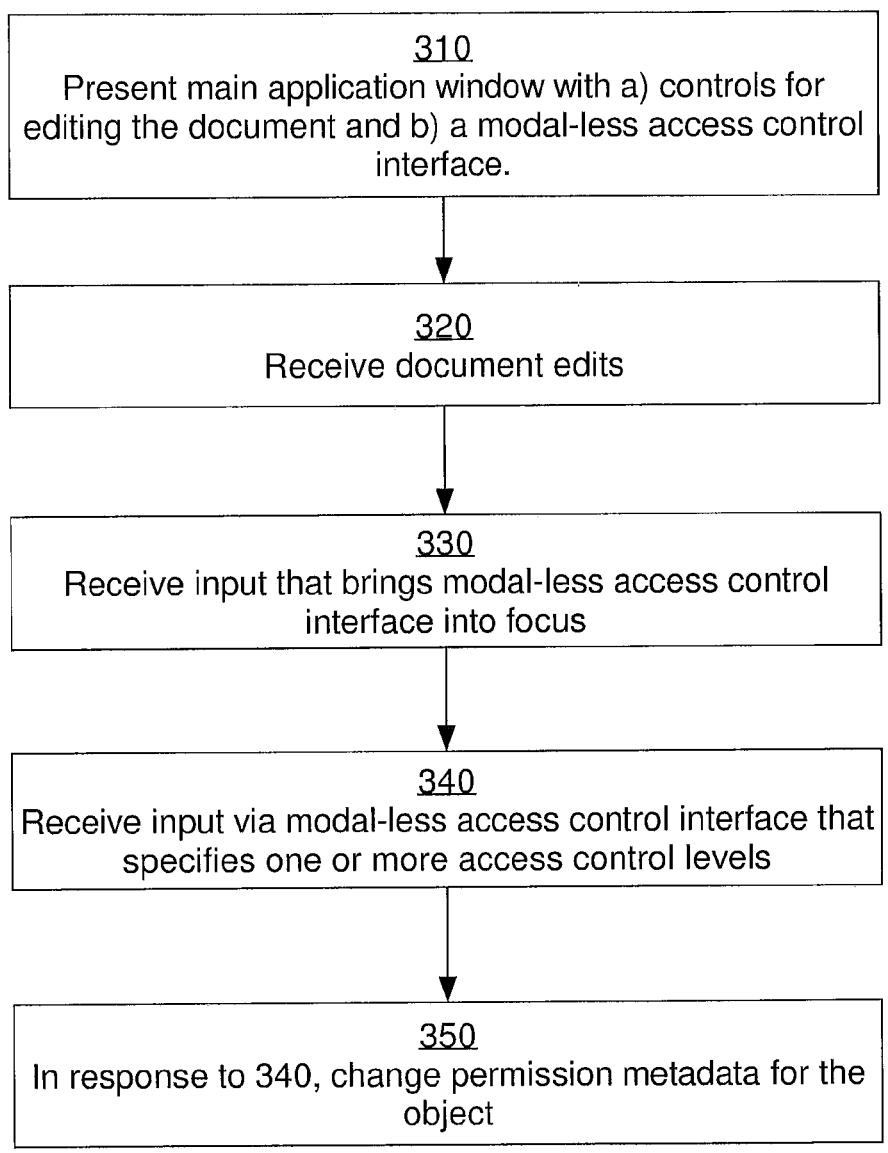
FIG. 3 is a flow chart illustrating a method for providing modal-less access control management for an object.

FIG. 3 is a flow chart 300 illustrating a method for providing modal-less access control management for an object, according to an embodiment. The illustrated embodiment is exemplary only—other embodiments may implement more or fewer steps, in different orders.

At step 310, an application executing at a computing device presents to a user a single application window for working with a document. This single application window includes at least: a) one or more controls for editing the document and b) a modal-less save interface. The one or more controls may be any controls suitable for accepting user input for editing the document, including text fields, buttons, pull-down menus, and drag-and-drop elements. The access control interface may include one or more controls for configuring access permissions for the document. For example, the access control interface may include one or more of: a pull-down box listing two or more access control levels, a set of one or more links specifying access control levels, or a set of one or more checkboxes specifying access control levels. An example application window is described in section 3.2.

At step 320, the application receives, via the one or more controls, one or more commands to add information to or modify information in the document. For example, a user may select and modify text displayed for the object in the application window.

At step 330, the application receives input that brings the access control interface into focus. For example, a user may use a mouse or enter a keystroke combination to bring the editable text box into focus.

At step 340, while the access control interface is in focus, the application receives input that specifies one or more access levels for the document. For example, the user may click on a pull-down menu and select one of the listed access control levels. Example access levels are discussed in section 3.4.

At step 350, the application changes permission metadata for the object in accordance with the input of step 340.

3.0. IMPLEMENTATION EXAMPLES 3.1. Example Modal-Less Save Interface

Figure 4:
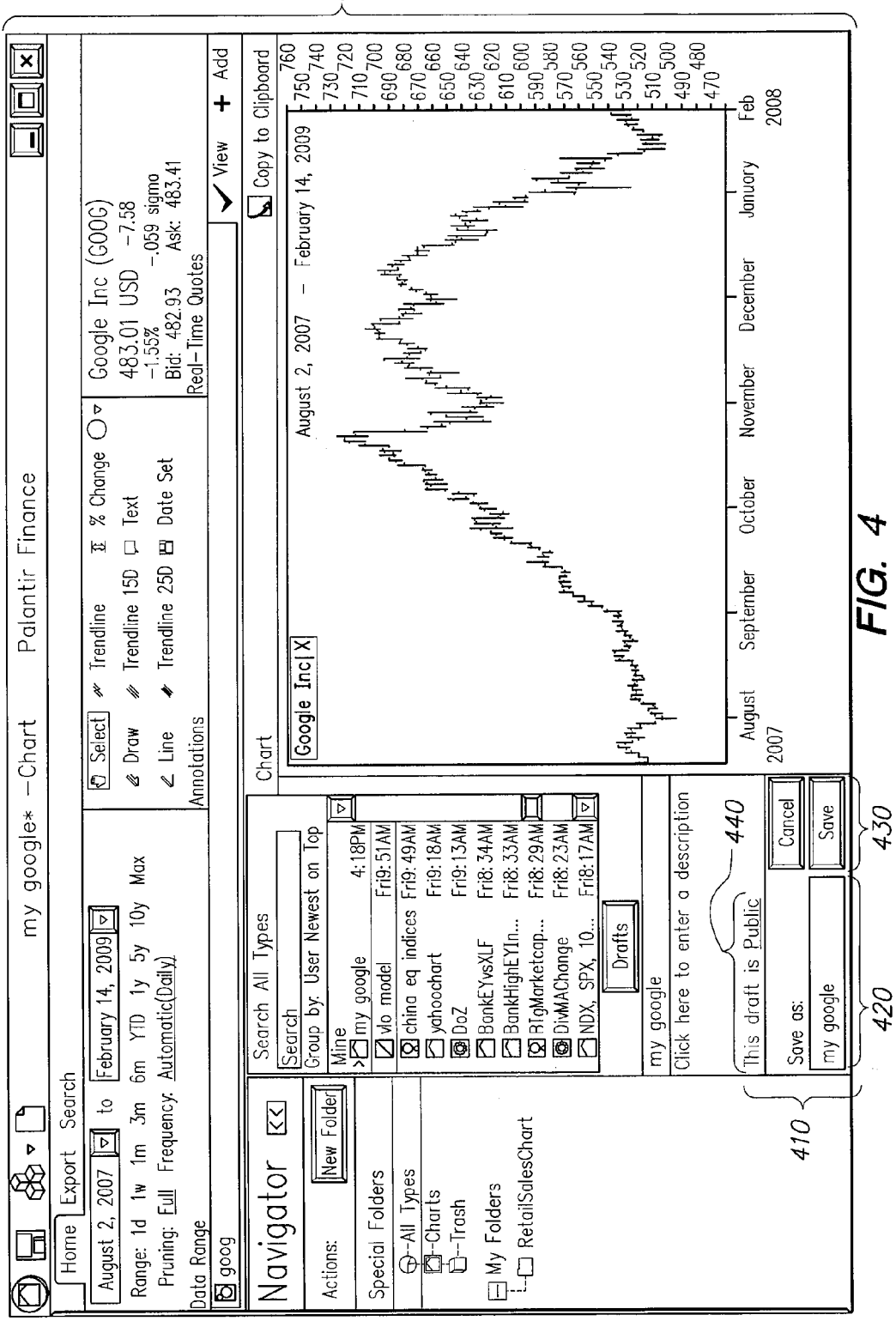
FIG. 4 depicts a modal-less save interface and access control interface within a main application window.

FIG. 4 depicts a modal-less save interface 410 within a main application window 400, according to an embodiment of the invention. Main application window 400 is the main graphical interface for a software application executing on a computer. Main application window 400 features a variety of controls that allow a user to edit a document. Although FIG. 4 depicts the editing of a financial report document, the document edited in main application window 400 may be any type of document, including a word processing document, spreadsheet, web page, data file, email, and so on.

A portion of main application 400 is occupied by save interface 410. Save interface 410 comprises a text entry control 420 and a save control 430. While interacting with application window 400, a user may at any time input a filename in text entry box 420. In response to receiving input via text entry control 420, the software application may save the document with the designated filename. For example, a user may type the filename. Then, user may signal that the filename has been fully entered by pressing the ENTER key or clicking on a button of a pointing device.

Text entry control 420 may also be configured to receive input designating a folder or directory for saving the document.

Save control 430 is a button that, when selected, causes the software application to save the currently opened document with the filename designated in text entry control 420. A user may select save control 430 at any time when working within main application window 400 by, for instance, clicking on save control 430.

The user may enter a different name in text entry control 420 at any time. When the user enters a new name in the text entry control 420 and selects save control 430, the current document is saved using the newly entered name. No modal window or save dialog is displayed and the user's work is not interrupted. For example, as illustrated by the method of FIG. 2, it is possible for a user to enter just one or two characters of a new filename in the text entry control 420, then interact with other features of the application without completing a save operation, then complete the new filename, then select the save control 430. In this way, the user can initiate a save operation, perform other application tasks, and then later complete the save operation at a convenient time.

Moreover, saving different versions of the document under different filenames becomes as simple as entering each different filename in the text entry control 420 and selecting the save control 430. The user can interrupt any interaction with the text entry control 420 at any time without having to close a modal window or suffer other interruptions.

3.2. Example Modal-Less Access Control Interface

The main application window 400 of FIG. 4 also comprises an access control interface 440, according to an embodiment of the invention. Access control interface 440 is a link. When a user clicks on access control interface 440, the application sets the access control level for the currently open document to "Public." As an example, the access control interface 440 is depicted as part of save interface 410. However, access control interface 440 may also be entirely separate from save interface 410.

3.3. Save Status Feedback

According to an embodiment of the invention, an application may utilize a modal-less save interface to provide a user with feedback indicating the status of saving a current document. The application may assign different appearances to the save interface depending on the save status of the document. In this manner, the application may indicate to a user that a document has not been saved within a certain time period or that the document has changed since it was last saved.

For example, the save interface may be displayed using a new color, font size or style, or interface size. To more visibly call attention to the save status of a current document, the appearance of the save interface may oscillate between two different states. For example, the controls of the save interface may feature a distinctive color that periodically becomes more saturated and less saturated, thus appearing to fade in and out or appearing to "glow."

Figure 5:
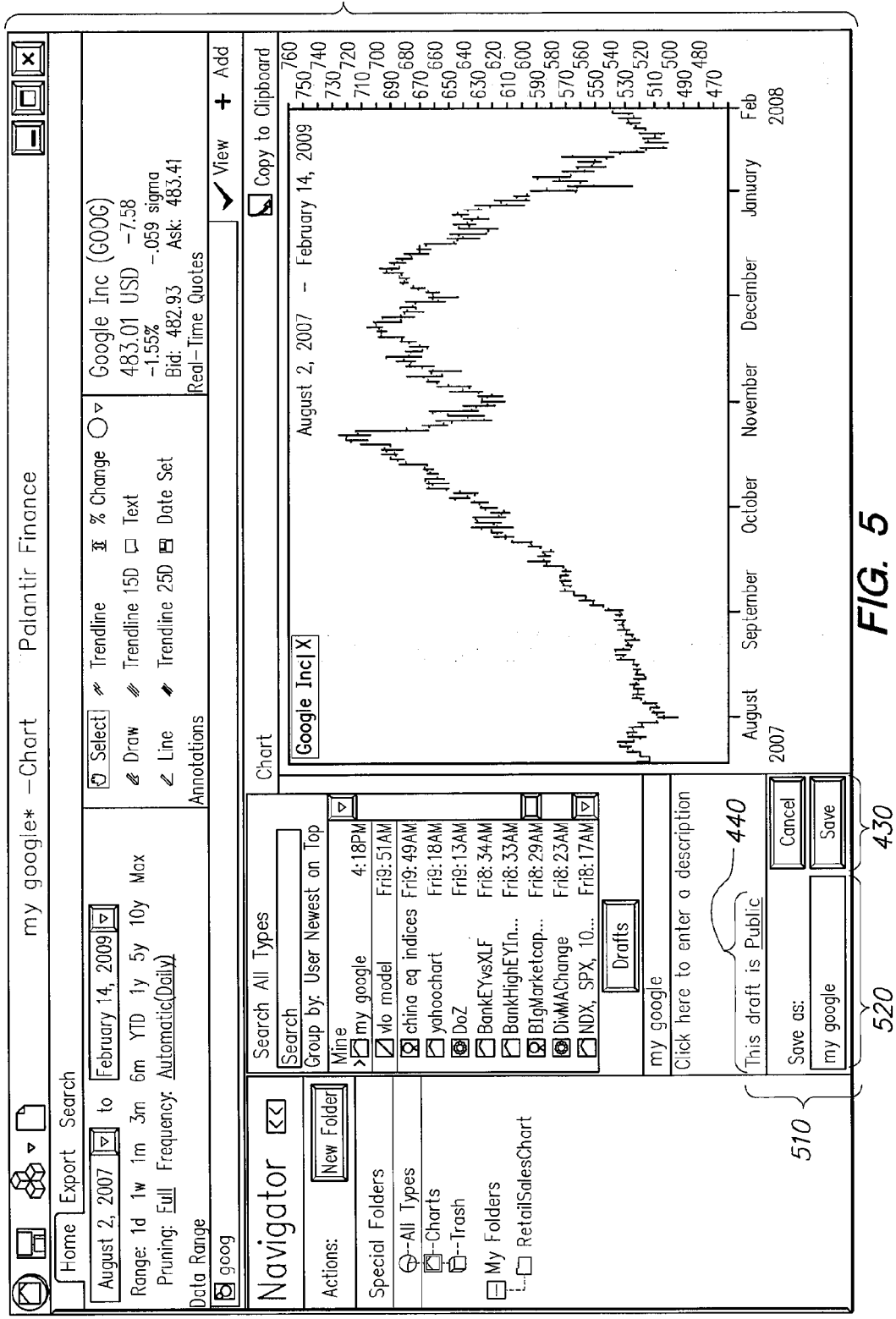
FIG. 5 illustrates how a software application may assign a different appearance to a modal-less save interface to indicate the save status of a document being edited within a main application window.

FIG. 5 illustrates how a software application may assign a different appearance to modal-less save interface 510 to indicate the save status of a document being edited within main application window 400, according to an embodiment of the invention. In contrast with text entry control 420 of FIG. 4, the border of text entry control 520 of FIG. 5 is depicted as "glowing," indicating that the current financial document contains information that should be saved. Because of the resulting different appearance of save control 530, a user of the application is more likely to notice save control 530 and perform a save operation.

3.4. Access Levels

In some embodiments, the access control interface may only allow a user to designate the currently open document as public or private. In other embodiments, the access control interface may allow a user to set the access control level for a document to one of a variety of access control levels. Each access control level may permit or prohibit various levels of document access to different users or user groups. The various levels of document access may include, for example, permissions to read, write, or modify the document, as well as permissions to be aware that the document exists.

For example, an access control interface may feature a pull-down menu listing access control levels of "Public," meaning that the document may be accessed by all users, "Restricted to Group," meaning that the document may only be accessed by the user's group, and "Restricted to User," meaning that the document may only be accessed by the user. While editing a document in the main application window, the user may select one of these levels from the pull-down menu. In response, the application may instantly set the access control level for the document to correspond to the selected access control level.

Access control levels may be built-in to the application, or they may be configured on a server and then imported into the application. Data indicating access control levels for a document may be stored as metadata within the document, as metadata on a server at which the document is stored, or as metadata in a file system.

4.0. IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
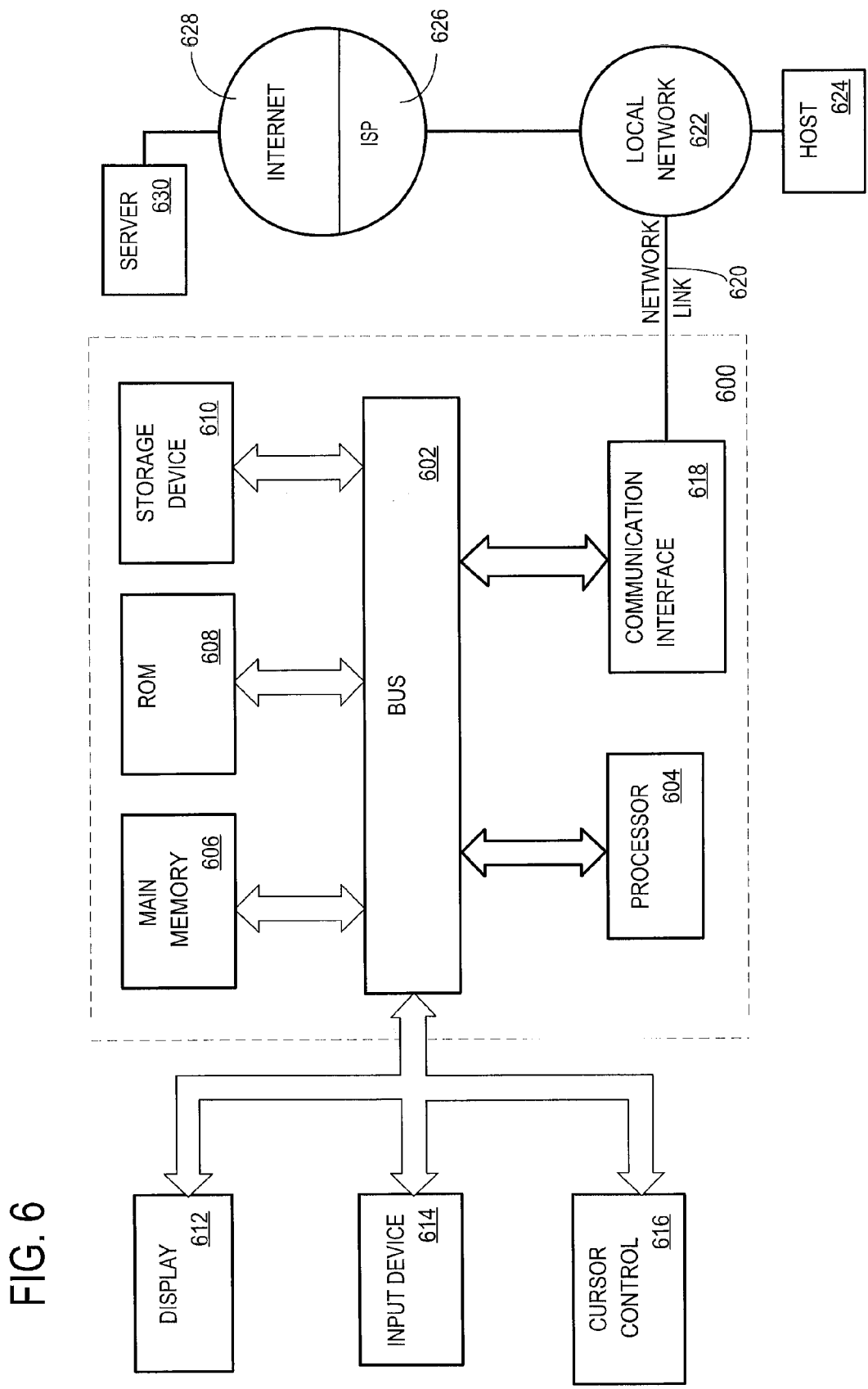
FIG. 6 is block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0. EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

6.0. CONCLUSION

The above described techniques provide an application user with more efficient access to save functionality. Because a save operation may be triggered without switching to a different window, the above-described techniques avoid the overhead associated with the modal windows used in traditional save operations. Nor do the techniques require a user to memorize a correct combination of keystrokes to trigger a save operation. Furthermore, by placing a filename entry box directly within the main application window, the above described techniques allow a user to rapidly save a document under different filenames, thereby allowing a user to create different versions of a document with relative ease.

The above-described techniques also greatly simplify the process of controlling access to documents. By providing a user with a modal-less access control interface, an application allows a user rapid access to access control features, without the confusion and inefficiency of navigating through menu items and modal dialogs.

What is claimed is:

1. A method comprising:
   presenting a single application window comprising at least: a graphical presentation of contents of a document, one or more graphical user interface controls configured to receive edits to the contents of the document, and a save interface comprising an editable text box;
   wherein the save interface is configured to permit save operations on the document to different locations without creating a modal window for the save operations;
   while displaying the save interface in the application window, receiving, via the one or more graphical user interface controls, one or more edit commands to modify the contents of the document;
   in response to the one or more edit commands, changing the graphical presentation of the contents of the document and changing an appearance of the entire save interface to indicate that the document contains unsaved modifications;
   receiving, in the save interface, input in the editable text box that indicates a location at which to save the document;

in response to termination of the input that specifies a location at which to save the document, storing the document at the location, wherein the termination of the input that specifies a location at which to save the document is a change in focus away from the editable text box;

wherein the method is performed by one or more computing devices.

2. The method of claim 1, wherein changing the appearance of the entire save interface comprises rendering a glow effect around an editable text box for specifying the location in the save interface.

3. The method of claim 1, wherein changing the appearance of the entire save interface comprises oscillating between two different appearances for the save interface, wherein the first appearance of the two different appearances comprises a glow effect around the editable text box for specifying the location in the save interface, wherein the second appearance of the two different appearances does not comprise the glow effect around the editable text box.

4. The method of claim 1 comprising:
receiving, in the save interface, first input specifying a first portion of a name;
subsequent to the first input, without closing the save interface, receiving, via the one or more graphical user interface controls, second input specifying one or more changes to the contents of the document;
in response to the second input, changing the graphical presentation of the contents of the document;
subsequent to the second input, receiving, in the save interface, third input specifying a second portion of the name;
wherein the name comprises the second portion added to the first portion;
subsequent to the third input, receiving fourth input indicating that the name has been fully entered;
in response to the fourth input, saving the document at a location based upon the name;
wherein the method is performed by one or more computing devices.

5. The method of claim 4, wherein the second input is received in the application window, and wherein the save interface is a modal-less interface inside the application window.

6. The method of claim 1, further comprising, after saving the document, without closing the window, continuing to receive edit commands to the contents of the document, without closing the window.

7. The method of claim 1, wherein the instructions, when executed by the one or more processors, further cause, after saving the document, without closing the window, receiving additional edit commands to the contents of the document, followed by second input that specifies a new location at which to save the document.

8. The method of claim 1, wherein the one or more graphical user interface controls configured to receive edits to the contents of the document are within the graphical presentation of the document.

9. A method comprising:
presenting a window comprising at least: a graphical presentation of contents of a document, one or more graphical user interface controls configured to receive edits to the contents of the document, a save interface comprising both an editable text box and an access control interface;
wherein the editable text box and the access control interface are both visible within the save interface at the same time;
wherein the save interface is configured to permit save operations on the document to different locations without creating a modal window for the save operations;
while displaying the save interface in the application window, receiving, via the one or more graphical user interface controls, one or more edit commands to modify the contents of the document;
in response to the one or more edit commands, changing the graphical presentation of the contents of the document;
receiving, in the access control interface, input that specifies one or more access control levels for the document and receiving values of individual access controls for a plurality of users;
responsive to receiving the input that specifies the one or more access control levels for the document, instantly changing permission metadata for the document, while the document is still open in the window;
receiving, in the save interface, input in the editable text box that indicates a location at which to save the document;
in response to termination of the input that specifies a location at which to save the document, storing the document at the location, wherein the termination of the input that specifies the location at which to save the document is a change in focus away from the editable text box;
wherein the method is performed by one or more computing devices.

10. The method of claim 9, wherein the access control interface is one of:
a pull-down box listing two or more access control levels, a set of one or more links specifying access control levels, or a set of one or more checkboxes specifying access control levels.

11. One or more storage media storing instructions which, when executed by one or more processors, cause:
presenting a window comprising at least: a graphical presentation of contents of a document, one or more graphical user interface controls configured to receive edits to the contents of the document, and a save interface comprising an editable text box;
wherein the save interface is configured to permit save operations on the document to different locations without creating a modal window for the save operations;
while displaying the save interface in the application window, receiving, via the one or more graphical user interface controls, one or more edit commands to add to or modify the contents of the document;
in response to the one or more edit commands, changing the graphical presentation of the contents of the document and changing an appearance of the entire save interface to indicate that the document contains unsaved modifications;
receiving, in the save interface, input in the editable text box that indicates a location at which to save the document;
in response to termination of the input that specifies a location at which to save the document, storing the document at the location, wherein termination of the input that specifies a location at which to save the document is a change in focus away from the editable text box.

12. The one or more storage media of claim 11, wherein changing the appearance of the entire save interface comprises rendering a glow effect around an editable text box for specifying the location in the save interface.

13. The one or more storage media of claim 11, wherein changing the appearance of the entire save interface comprises oscillating between two different appearances for the save interface, wherein the first appearance of the two different appearances comprises a glow effect around the editable text box for specifying the location in the save interface, wherein the second appearance of the two different appearances does not comprise the glow effect around the editable text box.

14. The one or more storage media of claim 11 comprising instructions which, when executed by one or more processors, cause:
   receiving, in the save interface, first input specifying a first portion of a name;
   subsequent to the first input, without closing the save interface, receiving, via the one or more graphical user interface controls, second input specifying one or more changes to the contents of the document;
   in response to the second input, changing the graphical presentation of the contents of the document;
   subsequent to the second input, receiving, in the save interface, third input specifying a second portion of the name;
   wherein the name comprises the second portion added to the first portion;
   subsequent to the third input, receiving fourth input indicating that the name has been fully entered;
   in response to the fourth input, saving the document at the location based upon the name.

15. The one or more storage media of claim 14, wherein the second input is received in the application window, and wherein the save interface is a modal-less interface inside the application window.

16. The one or more storage media of claim 11, wherein the instructions, when executed by the one or more processors, further cause, after saving the document, without closing the window, continuing to receive edit commands to the contents of the document, without closing the window.

17. The one or more storage media of claim 11, further comprising, after saving the document, without closing the window, receiving additional edit commands to the contents of the document, followed by second input that specifies a new location at which to save the document.

18. The method of claim 11, wherein the one or more graphical user interface controls configured to receive edits to the contents of the document are within the graphical presentation of the document.

19. One or more storage media storing instructions which, when executed by one or more processors, cause:
   presenting a window comprising at least: a graphical presentation of contents of a document, one or more graphical user interface controls configured to receive edits to the document, a save interface comprising both an editable text box and an access control interface;
   wherein the editable text box and the access control interface are both visible within the save interface at the same time;
   wherein the save interface is configured to permit save operations on the document to different locations without creating a modal window for the save operations;
   while displaying the save interface in the application window, receiving, via the one or more graphical user interface controls, one or more edit commands to add to or modify the contents of the document;
   in response to the one or more edit commands, changing the graphical presentation of the contents of the document;
   receiving, in the access control interface, input that specifies one or more access control levels for the document and receiving values of individual access controls for a plurality of users;
   responsive to receiving the input that specifies the one or more access control levels for the document, instantly changing permission metadata for the document, while the document is still open in the window;
   receiving, in the save interface, input in the editable text box that indicates a location at which to save the document;
   in response to termination of the input that specifies a location at which to save the document, storing the document at the location, wherein termination of the input that specifies a location at which to save the document is a change of focus away from the editable text box.

20. The one or more storage media of claim 19, wherein the access control interface is one of: a pull-down box listing two or more access control levels, a set of one or more links specifying access control levels, or a set of one or more checkboxes specifying access control levels.

* * * * *